United States Patent [19]
Valentine et al.

[11] Patent Number: 6,088,589
[45] Date of Patent: Jul. 11, 2000

[54] SYSTEM, METHOD AND APPARATUS FOR HANDLING HIGH-POWER NOTIFICATION MESSAGES

[75] Inventors: Eric Valentine, Plano, Tex.; Kenneth Rains, Stockholm, Sweden

[73] Assignee: Ericsson Inc., Research Triangle Park, N.C.

[21] Appl. No.: 08/989,088

[22] Filed: Dec. 11, 1997

[51] Int. Cl.⁷ ................................................. H04Q 7/38
[52] U.S. Cl. ........................ 455/433; 455/458; 455/12.1
[58] Field of Search ................................... 455/433, 415, 455/458, 459, 12.1, 456, 466, 412, 427

[56] References Cited

U.S. PATENT DOCUMENTS

| | | | |
|---|---|---|---|
| 4,994,797 | 2/1991 | Breeden | 340/825.44 |
| 5,315,635 | 5/1994 | Kane et al. | 455/31.2 |
| 5,361,295 | 11/1994 | Solomon et al. | 379/67 |
| 5,363,426 | 11/1994 | Nyhart | 455/458 |
| 5,404,569 | 4/1995 | Schwendeman et al. | 455/13.4 |
| 5,594,776 | 1/1997 | Dent | 455/458 |
| 5,732,359 | 3/1998 | Baranowsky, II et al. | 455/552 |
| 5,815,808 | 9/1998 | Valentine | 455/422 |
| 5,884,170 | 3/1999 | Valentine et al. | 455/433 |
| 5,915,222 | 6/1999 | Olsson et al. | 455/466 |

FOREIGN PATENT DOCUMENTS

| | | |
|---|---|---|
| 2 253 972 | 9/1992 | United Kingdom . |
| 2 319 696 | 5/1998 | United Kingdom . |
| WO 94/10791 | 5/1994 | WIPO . |
| WO 96/21332 | 7/1996 | WIPO . |
| WO 97/26764 | 7/1997 | WIPO . |

*Primary Examiner*—Dwayne D. Bost
*Assistant Examiner*—Erika A. Gary
*Attorney, Agent, or Firm*—Jenkens & Gilchrist

[57] ABSTRACT

A system, method and mobile station in a telecommunications system for handling communication requests in the form of call attempts and attempts to send text messages from a requesting party to the mobile station where the mobile station is unreachable via a normal-power-level page signal. After the mobile station has failed to respond to at least one normal-strength, first page signal, a subscriber database is consulted to determine if the mobile station is attached to the telecommunications system. If the mobile station is attached, an identifier associated with the requesting party is compared with the contents of a communication screening list associated with the mobile station to determine whether a second, higher-power page signal, called a High-Power Notification (HPN) page, may be sent to the mobile station. If so, the mobile station is paged through the HPN page signal, either via a terrestrially-based part of the telecommunications system or through a satellite-based part of the telecommunications system.

28 Claims, 3 Drawing Sheets

SYSTEM, METHOD AND APPARATUS FOR HANDLING HIGH-POWER NOTIFICATION MESSAGES

BACKGROUND OF THE PRESENT INVENTION

1. Field of the Invention

The present invention is directed to a telecommunications system and method for handling call attempts directed to a mobile station, particularly to a system and method for determining when and how calls and/or calling party information is forwarded to the called party in mobile-terminated calls. The invention furthermore relates to a mobile station employing the proposed system and method according to the present invention.

2. Background and Objects of the Present Invention

Methods and systems for message delivery to mobile stations under insufficient or disturbed radio coverage are set forth in applicant's co-pending U.S. patent application Ser. No. 08/719,282, entitled "Subscriber Feature Controlled High Power Messaging", filed Sep. 24, 1996 and Ser. No. 08/931,625, entitled "System and Method for Forwarding Calling Party Information", filed Sep. 16, 1997, respectively. The former application discloses a system and method for overcoming signal path interference during the delivery of messages to mobile stations by increasing the power of at least the initial communications transmissions, thereby enabling satellite high-power notification of mobile stations that are unreachable via a terrestrially-based telecommunications system. The latter application describes a system and method for reducing the risk of seizing trunk lines for mobile-terminated call attempts, which are impossible to complete due to the fact that the mobile station receives insufficient radio energy (e.g., is shadowed), only has access to intolerably disturbed communication resources, or is detached from the telecommunications system. Hence, futile high-power notification messages are stopped before being sent to mobile stations that are unable to respond to them, e.g., mobile stations being powered off.

Generally, a high-power notification message does not result in a call being set up (due to poor communication conditions). It is, therefore, highly desirable for a subscriber to be reachable by the most important call and text message attempts when located at a position where a high-power notification message is the only way to contact the subscriber's mobile station.

Nevertheless, known solutions do not offer a mobile subscriber the possibility to indicate whether or not they wish to be reached via such high-power notification messages, nor do these solutions give an opportunity for the mobile subscriber to define which calling parties, if any, that shall be let through when the mobile station is located outside the coverage area of the terrestrially-based mobile telecommunications system.

An object of the present invention is thus to provide a method and a system for improved high-power notification in both terrestrially-based and satellite-based mobile telecommunications systems.

Particularly, it is an object of the invention to provide a call screening function through which a mobile subscriber may define what call attempts and attempts to send text messages to let through via a high-power notification service.

Yet a further object of the invention is to alert a user of a mobile station when the mobile station is located in an area where the terrestrially-based mobile telecommunications system within which the user is roaming provides insufficient coverage.

SUMMARY OF THE INVENTION

These objects are met by a first embodiment of the present invention where an incoming communication request, such as a call or text message, is directed to a particular mobile station. The call (or text message) is presumed to be originated from a particular network address, the identity of which is forwarded along with the call. Subsequently, a subscriber database is checked to determine whether or not the mobile station is attached to or detached from the telecommunications system. If the mobile station is attached, a normal page signal is sent to the mobile station from the telecommunications system. If this page signal is not responded to within a first predetermined time interval, a communication screening list related to the mobile station is consulted to determine whether a high-power notification page by the calling party is permitted. If so permitted, a notification signal, having a greater power level, is then sent to the mobile station. These notifications may be repeated until an acknowledgment is received from the mobile station or the notification attempts are abandoned due to the number or duration of the attempts.

A system according to the present invention includes a first mobile services switching center, for receiving a message from a calling party, and which forwards a first routing information request to a home location register (HLR) associated with the mobile station's subscription in the mobile telecommunications system. As in the aforementioned former application this first routing request to the HLR includes the calling party's number. The system further includes a second mobile services switching center, which is the switching center currently associated with the mobile station's location in the mobile telecommunications system. Naturally, the first and the second mobile services switching centers may be identical if the mobile station is located within an area served by the first mobile services switching center. The home location register then asks the second mobile services switching center for the roaming number of the mobile station. This request also includes the calling party's number.

If the called subscriber is attached to the second mobile services switching center, i.e., is available, the second MSC returns the roaming number to the HLR which, in turn, sends it to the first MSC, which sets up the call using the roaming number. Upon receipt in the second MSC, the second MSC starts paging. Escalation to high power notification or messaging is warranted if there is no response to the page and various screening criteria are met. If, however, the called subscriber is detached, i.e., unavailable, paging is not performed and high power notification (HPN) is begun immediately so long as various HPN criteria are met.

The system also includes a subscriber database where attachment or connection status information for all mobile stations currently associated with the second mobile services switching center is stored. The subscriber database also stores a customized high-power notification communication screening list for each of the associated mobile stations. Mobile subscribers who do not subscribe for the high-power notification service are not included in the screening list and thus do not meet the aforementioned HPN criteria. In operation, the subscriber database exchanges information about the HPN criteria with the second mobile services switching center prior to transmission of a high-power notification page signal.

A mobile station according to the invention includes a first transceiver for receiving the normal page signals and for responding to them. In addition, the mobile station includes a second transceiver for receiving the high-power page signals and for responding to them.

The present invention thus offers a system and method for improved high-power notification in terrestrially-based mobile telecommunications systems as well as in satellite-based mobile telecommunications systems.

The proposed solution particularly grants a call screening function through which a mobile subscriber can define what call attempts and attempts to send text messages to let through via a high-power notification service.

The invention also alerts a user of a mobile station when the mobile station is located where the communication coverage of the mobile telecommunications system within which the user is roaming is insufficient.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PREFERRED EMBODIMENTS

Although the preferred embodiments of the present invention may be embodied in many different forms, the invention should not be construed as limited to the embodiments set forth herein; rather, these embodiments are provided so that this disclosure will be thorough and complete, and will fully convey the scope of the invention to those skilled in the art.

Figure 1:
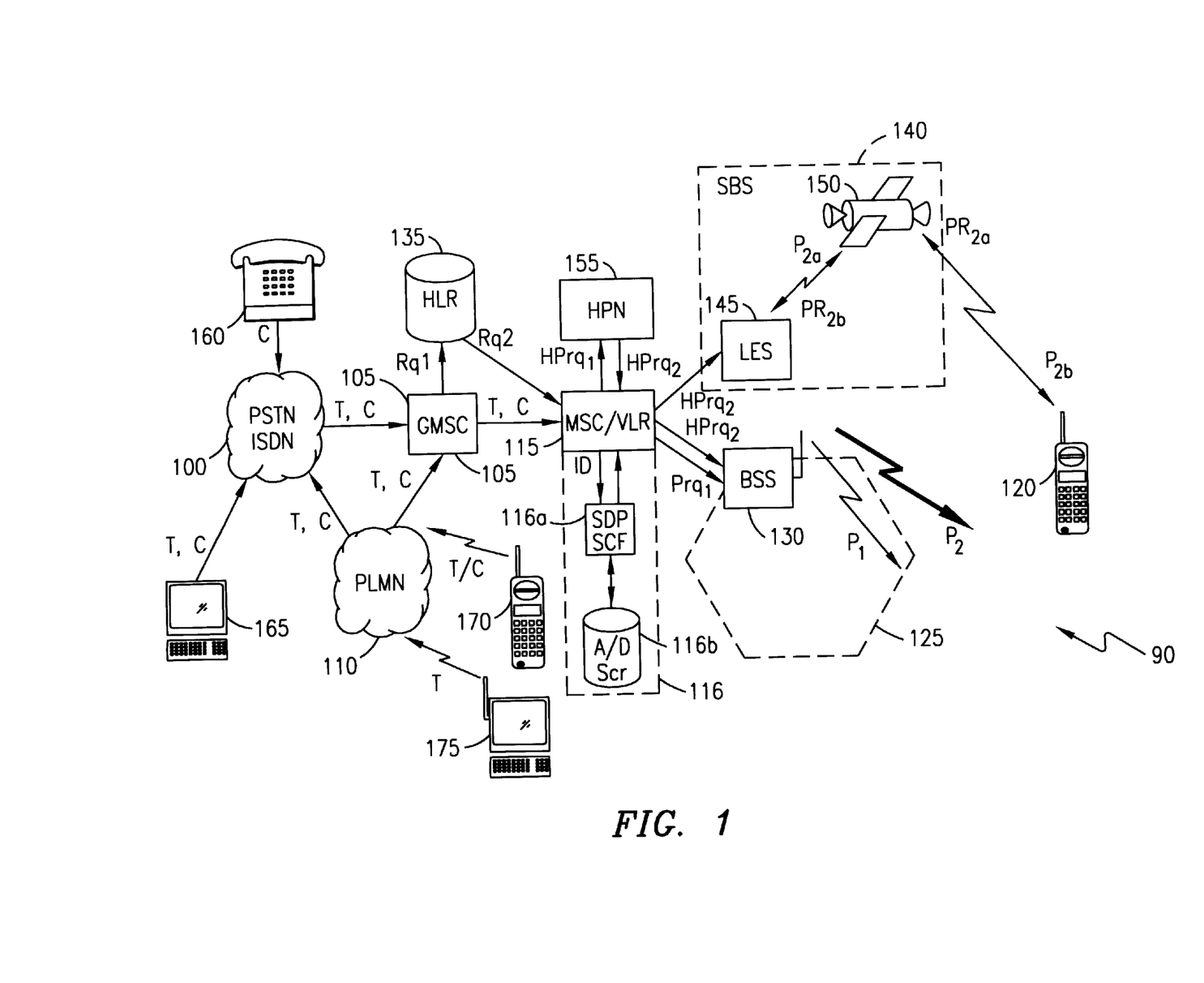
FIG. 1 illustrates a block diagram of an embodiment of a system in a mobile telecommunications system according to the invention.

In FIG. 1 is illustrated an embodiment of a telecommunications system according to the present invention. The system includes a terrestrially-based mobile telecommunication system as well as a satellite-based mobile telecommunication system which both may be used in implementing the improved high-penetration notification techniques of the present invention.

In particular, FIG. 1 shows a Public Switched Telephone Network (PSTN)/Integrated Services Digital Network (ISDN) 100 communicating with a first Mobile services Switching Center (MSC) 105, typically a gateway MSC (GMSC), which acts as a communication gateway between the PSTN/ISDN 100 and a mobile telecommunications network, such as a cellular network, a satellite network or a combined cellular-satellite network, such as illustrated in FIG. 1. MSC 105 exchanges information and instructions across a wireline link via, for example, ISDN User Part (ISUP) or Broadband ISUP (BISUP) protocols, as is understood in the art. Furthermore, the first MSC 105 may communicate with another mobile telecommunications network, e.g., a regular Public Land Mobile Network (PLMN) 110, such as a cellular network, either directly or indirectly via the PSTN/ISDN 100.

The combined cellular-satellite network is composed of a plurality of areas, each served by an MSC with an integrated Visitor Location Register (VLR) 115. The MSC/VLR areas, in turn, each include a plurality of location areas, which are defined as that part of a given MSC/VLR area in which a mobile station 120 may move freely without having to send update location information to the respective MSC/VLR 115 that controls the location area for the mobile station 120. Each location area is moreover divided into a number of cells 125, which are served by respective Base Station Subsystems (BSS) 130, which provide radio communication coverage to the geographical area within the cell 125, handling radio traffic to and from the mobile stations 120 therein. A mobile station 120 is the physical equipment, e.g., a car phone or a portable phone, used by a mobile subscriber to communicate with the combined cellular-satellite network.

The combined cellular-satellite network 90 includes a Home Location Register (HLR) 135, which is a database maintaining all subscriber information, e.g., user profiles, current location and routing information, International Mobile Subscriber Identity (IMSI) numbers, and other administrative information. Besides being co-located with a given MSC 105 (as is illustrated in FIG. 1), the HLR 135 may be an integral part of the MSC 105 or service multiple MSCs 105. IMSI is a unique 15-digit identification number assigned to each mobile station 120, and includes a Mobile Country Code (MCC) of three digits, a Mobile Network Code (MNC) of two (or three) digits, and a Mobile Subscriber Identification Number (MSIN), the latter two constituting a National Mobile Subscriber Identity (NMSI) number.

The VLR 115 is a database containing information about all of the mobile stations 120 currently located within the MSC/VLR area. If the mobile station 120 roams into a new MSC/VLR area, the VLR 115 connected to that MSC 115 will request data about that mobile station 120 from the HLR database 135 (simultaneously informing the HLR 135 about the current location of the mobile station 120). Accordingly, if the user of the mobile station 120 then wants to make a call, the local VLR 115 will have the requisite identification information without having to re-interrogate the HLR 135. In the aforedescribed manner, the VLR and HLR databases 115 and 135, respectively, contain various subscriber information associated with a given mobile station 120.

In addition to the terrestrially-based BSSs 130, the combined cellular-satellite system 90 includes a Satellite Base station Subsystem (SBS) 140. An SBS 140 includes at least one Land Earth Station (LES) 145 and at least one orbiting satellite 150, which provides communication coverage in the form of radio coverage to a geographical area on the earth below the satellite 150. The satellite 150 functions as a moving communication transponder between the LES 145 and the mobile station 120 and thus handles the radio traffic to and from the mobile station 120. As is understood in the art and as set forth in more detail in the aforementioned co-pending applications, the satellite 150 is also able to perform pages to mobile stations 120 within the range (or subranges thereof) of the satellite 150.

According to an embodiment of the present invention, the MSC/VLR 115 is connected to a High-Power Notification (HPN) node 155. In an alternative embodiment, the HPN node 155 is part of the MSC/VLR 115. The HPN node 155 regulates high-power notification mode communications with the mobile stations 120, as described in said co-pending patent applications, which are incorporated herein by reference. According to a preferred embodiment of the present invention, the MSC/VLR 115 also includes an Intelligent Network (IN) services unit 116, which in turn contains a Service Data Point (SDP) 116a for carrying out IN services. The IN 116 also contains a subscriber database 116b therein for storing information about the high-power notification mode capabilities of various BSSs 130 and SBSs 140 that may be employed in transmitting the high-power notification mode commands and other information, such as set forth in the copending patent applications. In a preferred embodiment of the present invention the subscriber database 116b also includes information regarding the connection status for the mobile stations 120, e.g., a connection status flag or other representative value for each such mobile station 120.

Connection status flags represent the connection status for the mobile stations 120 being associated with the MSC/VLR 115. A flag indicates whether a particular mobile station 120 is attached to or detached from the combined cellular-satellite system 90. Each flag may constitute 1–2 bits and represent two types of detachments, e.g., an implicit detachment where the mobile station 120 must reregister within a system defined period or an explicit detachment where the mobile station 120 has powered down.

The signal link margins or effective signal strengths from the BSSs 130 and the SBSs 140 in the combined cellular-satellite system 90 may not always have enough power for the mobile station 120 to detect the transmission. Through high-power notification (HPN), however, the mobile station 120 can hear a notification at a higher power level, as described in the co-pending applications. For example, an HPN subscriber in the combined cellular-satellite system 90 shown in FIG. 1 may receive an HPN message from the HPN node 155 via either the MSC/VLR 115 and the BSS 130 or via the MSC/VLR 115 and the SBS 140. Depending on the particular configuration of the system and the definition of the location areas, the MSC/VLR 115 connected with the BSS 130 and the MSC/VLR 115 connected with the SBS 140 may either be one and the same node (as illustrated in FIG. 1) or be two separate nodes. This high-power page request, albeit short in duration to conserve power, can nonetheless carry information therein, e.g., part of a short text message, the Calling Party number for terminating calls, etc., as discussed in more detail in the co-pending patent applications incorporated by reference herein.

Figure 2:
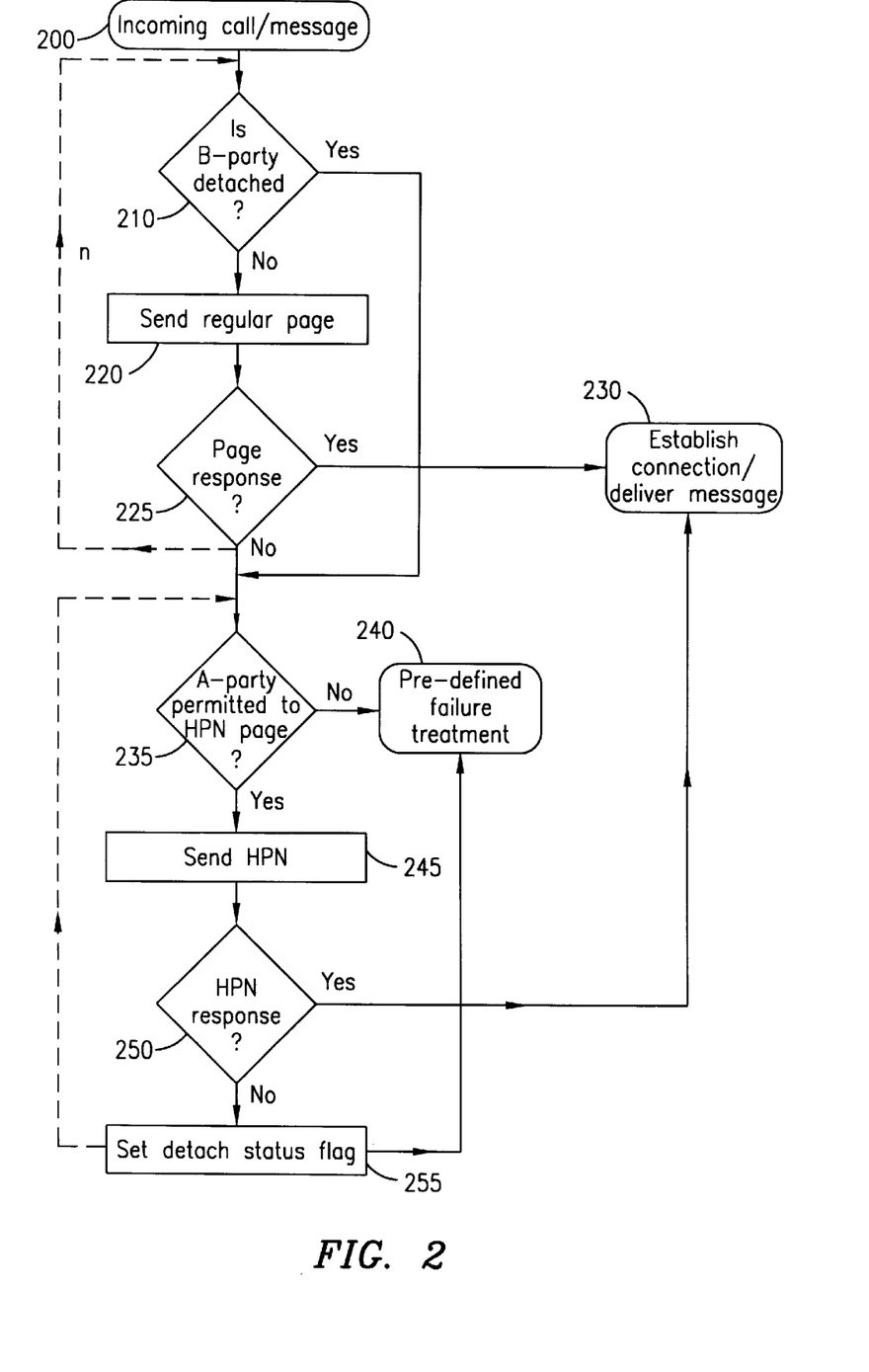
FIG. 2 shows a flow diagram of a method for handling call attempts and attempts to send text messages to a mobile station according to the invention.

Referring now to FIG. 2, a flow diagram for handling incoming communication requests in the form of call attempts and attempts to send text messages to a mobile station is shown. In a first step 200 a communication request comes in, being directed to a particular mobile station 120 in the combined cellular-satellite system 90. The mobile station 120 is thus a so-called B-party. The requesting party, or the A-party, may contact a mobile station 120 in the combined cellular-satellite system via one of a plurality of terminals and/or telecommunication networks.

A first scenario is to make a phone call C from a regular telephone 160 in the PSTN 100, as shown in FIG. 1. A second alternative is to send a voice message C or a text message T from a computer terminal 165 connected to the ISDN 100. A third and a fourth alternatives are to either send a voice C or text T message from a mobile station 170 or to send a text message T from a data terminal 175 roaming in the PLMN 110, which is separate from the combined cellular-satellite system 90 or is included in the combined cellular-satellite system.

Along with a communication request from the calling or A-party, the message sent to the first MSC 105 preferably includes a called party identifier, typically a first telephone number, and a calling party identifier ID, which typically includes a second telephone number. With reference again to FIG. 1, the first MSC 105 forwards a first routing information request Rq1 to the HLR 135, where current location and routing information for the called mobile station 120 is stored. The HLR 135 in turn sends a second routing information request Rq2 to the MSC/VLR 115 presently responsible for setting up calls with and delivering text messages to the mobile station 120. Subsequently, an IN service is initiated in the SDP 116a.

On the basis of the aforedescribed called and calling party identifiers and with reference again to FIG. 2, a second step 210 is to then check the subscriber database 116b to determine whether the mobile station 120 is attached to or detached from the combined cellular-satellite system 90. More precisely, the status of an attached/detached flag in the subscriber database 116b, associated with that mobile station 120, is investigated.

If a detached status flag for the mobile station 120 (which is the B-party in this communication request) is set, i.e., the subscriber (B-party) is unavailable, normal pages are unnecessary and control is transferred to high-power notification handling (steps 235 onward), discussed further hereinafter.

If, however, the mobile station 120 (B-party) is attached (step 210), a normal page signal $P_1$ is sent via the cellular system (step 220). In particular, with reference again to FIG. 1, a first page request $Prq_1$ is sent from the MSC/VLR 115 to the BSS 130, which in turn transmits the first page signal $P_1$ directed to the mobile station 120, as understood in the art.

With further reference to FIG. 2, after the page $P_1$ (step 220) step 225 checks whether there has been a response. If the mobile station 120 has not responded to the page $P_1$ within a first predetermined time interval $T_1$ (the parameter $T_1$ being stored in the subscriber database 116b), e.g., because the mobile station 120 is located outside the cell(s) 125 served by the BSS 130 or the radio energy from the BSS 130 is obstructed from reaching the mobile station 120 for any other reason, the paging procedure may be repeated up to a predetermined number of n times by returning to step 210.

Under special circumstances another type of page signal $P_2$ may follow the first page signal $P_1$. This second page signal $P_2$ may be transmitted by the BSS 130, shown in FIG. 1, at a power level exceeding the normally prescribed maximum power level for the cell 125. An example of such a circumstance is when the cell 125 is located next to or on a coast line, where the radio energy emitted from the BSS 130 is directed towards the waterfront. In that case, the increased paging power in the cell 125 should not deteriorate radio communications within neighboring cells, since the increased paging was directed away from other cells.

If the mobile station 120 responds to the first page signal $P_1$ before the first predetermined time interval $T_1$ elapses (step 225), well-known techniques in the art may be applied to establish a connection between the terrestrially-based part of the telecommunications system 90 and the mobile station 120 if the A-party placed a call C, or to deliver a text message T to the mobile station 120 (step 230).

However, if there is no response to the first page signal $P_1$ within the first predetermined time interval $T_1$ (after the aforementioned n potential repetitions of the steps 210–225), a Service Control Function (SCF) within the SDP 116a compares a communication screening list Scr stored within the subscriber database 116b with the identifier ID of the requesting party (A-party) to determine if the requesting party is permitted to reach the mobile station 120 via an HPN page and thus communicate with the mobile station 120. The communication screening list Scr may either be a positive listing, i.e., include all identifiers ID allowed to pass, or be a negative listing, i.e., a so-called bar list, which includes identifiers that are not allowed to pass. It is also understood that groups of identifiers ID can be defined in the communication screening list Scr by, for instance, entering a truncated identifier ID to describe all communication requests initiated from a certain country, a certain area, a certain local exchange, etc.

If the requesting party (A-party) is not permitted to reach the mobile station 120 via a HPN page (step 235), according to the communication screening list Scr, the procedure is transferred to step 240.

In step 240, a pre-defined communication failure routine is initiated for the incoming communication request. In case the incoming communication request is a text message, the failure routine either implies re-transmitting the text message as soon as the subscriber database 116b indicates that the mobile station 120 is attached to the combined cellular-satellite telecommunications system 90, or re-transmitting the text message after a predetermined time interval $T_R$ has elapsed. The time interval $T_R$ is stored in the subscriber database 116b. If, on the other hand, the communication request is a call attempt, the failure routine typically involves forwarding the call to a voice mail service associated with the mobile station's 120 subscription. Alternatively, it may imply announcing to the calling party that the mobile station 120 is currently unreachable.

If, however, the requesting party is permitted to communicate with the mobile station 120 (step 235), an HPN page signal, having a power level exceeding the power level of the normal page signal, is initiated in step 245. An HPN page request signal $HPrq_1$ is then sent from the MSC/VLR 115 to the HPN node 155. If the mobile station 120 happens to be located in an area where page signals may be transmitted at increased power levels via the cellular system, as described earlier under the special circumstances, an HPN page request signal $HPrq_2$ is sent from the HPN node 155 to the BSS 130 via the MSC/VLR 115. It should nonetheless be understood that the aforementioned $HPrq_2$ signal may go directly from the HPN node 155 to the BSS 130, as is understood in the art. BSS 130 subsequently transmits the high-power, terrestrially-based page signal $P_2$ to the mobile station 120.

Where the aforementioned communication screening list Scr allows the requesting party to reach the mobile station 120, the HPN node 155 analyzes the high-power mode capabilities of an SBS 140 to service the mobile station 120, as described in the co-pending patent applications. The HPN node 155 then determines when a particular satellite 150 in the SBS will be able to service the coverage area in which mobile station 120 was last known to be present. High-power mode transmissions are then scheduled accordingly. If, however, the satellite 150 does not have the capability for high-power mode transmissions, then the HPN node 155 analyzes when the next high-power mode capable satellite will be able to service the coverage area in which the mobile station 120 was last known to be present and schedules high-power mode transmissions accordingly. The second HPN page request signal $HPrq_2$ is sent from the HPN node 155 to the SBS 140 via the MSC/VLR 115. The LES 145 in the SBS 140 then sends an initial part $P_{2a}$ of a second type of page signal to the satellite 150, which generates a final part $P_{2b}$ of the second type of page signal. This final part $P_{2b}$ is here an HPN page signal, which has a higher power level than the first, normal type of page signal $P_1$, described hereinabove.

If the mobile station 120 responds (step 250) to this terrestrially-directed HPN page signal $P_{2b}$ within a second predetermined time interval $T_2$ (the parameter $T_2$ also being stored in the subscriber database 116b), the procedure returns to step 230. It should, of course, be understood that if the incoming call attempt is to a detached subscriber, then no connection between the telecommunications system and the mobile station 120 is established and only the calling party number is sent in the HPN notification. If the incoming call is to an attached subscriber who has not responded to the initial page (step 220), the incoming call may be forwarded to a normal "unreachable" call treatment, e.g., forward to voice mail, while the HPN signal may be simultaneously sent to the called party (along with the caller's number). In this manner, the called party is informed of the caller's identity and may call back later. Lastly, if an attached caller responds to the HPN (step 250), a connection between the telecommunications system and the mobile station 120 will be established in case the A-party placed a call C. If instead a text message T was sent by the A-party, this message will be delivered to the mobile station 120.

The mobile station 120 responds to the HPN page signal $P_{2b}$ by sending to the satellite 150 an initial part of a second page response signal $PR_{2a}$, which is linked to the LES 145 as a final page response signal $PR_{2b}$. The initial part of the second page response signal $PR_{2a}$ contains a predetermined symbol pattern (e.g., a sequence of binary 1's) sent on a communication resource especially dedicated and optimized for this purpose, such as a channel on a frequency having first-rate propagation properties under the prevailing topographical and atmospheric circumstances. The communication resource used is chosen so that the probability of the second response signal $PR_{2b}$ actually reaching the satellite is the highest possible.

On the other hand, if the mobile station 120 fails to respond (step 250) to the HPN page signal $P_{2b}$ within the second predetermined time interval $T_2$, a page time out signal in the satellite 150 triggers the setting of a detached status (step 255)for the mobile station 120 in the subscriber database 116b. Alternatively, further HPN page signals may be sent either immediately or after a predetermined or random time interval (repeat steps 235–255)

It should be understood that the implementation of the aforedescribed HPN paging into the combined cellular-satellite system 90 context creates various scenarios for mobile-terminated calls or text messages.

For example, in step 235 an inquiry is made whether an A-party is permitted to communicate with the mobile station 120 via a HPN page. It must also be determined whether or not the communication screening list Scr is activated for the particular mobile station 120. In a preferred embodiment of the invention, an inactivated communication screening list Scr implies total blocking of all HPN pages to the mobile station 120. By this reasoning, the same is true also for a mobile station 120 associated with a subscription that does not include a communication screening list Scr. In another embodiment of the present invention, however, the opposite applies, i.e., the HPN pages are always let through if the communication screening list Scr is inactivated (typically when a blocking list is utilized).

The contents of the communication screening list Scr and the definition of a screening function (positive/negative listing) is entered into the telecommunications system 90 primarily via a given mobile station 120. A Direct Transfer Application Part (DTAP) protocol, an Unstructured Supplementary Service Data (USSD) protocol or a Short Message Service (SMS) may be employed to convey the information to the SDP 116a. Alternatively a data terminal operating via an x.25 protocol or a Transmission Control Protocol/Internet Protocol (TCP/IP) may be used to access and edit the communication screening list Scr in the subscriber database 116b.

Figure 3:
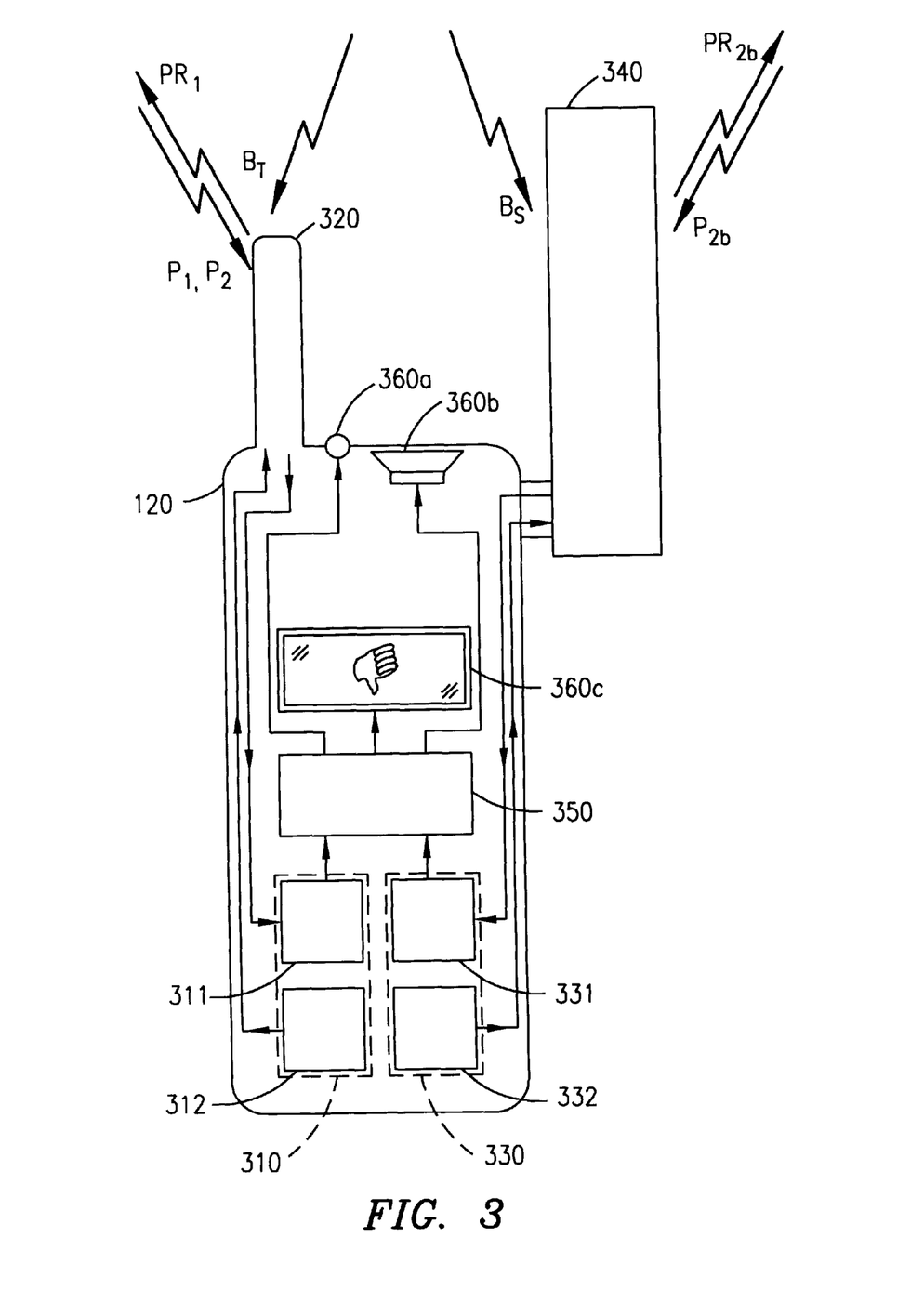
FIG. 3 shows a block diagram of a mobile station according to the invention.

A block diagram of the mobile station 120 for receiving incoming calls and text messages according to the invention is shown in FIG. 3. The mobile station 120 is configured to alert its user of the fact that the mobile station 120 is located outside the coverage area of a terrestrially-based mobile telecommunications system. This alerting gives the user an opportunity to arrange their mobile station to receive paging signals from the satellite-based part of the telecommunications system (e.g., unfold the mobile station's 120 satellite antenna) or move the mobile station 120 to a location where the radio receiving conditions are more favorable with respect to the terrestrially-based part of the system. The alerting function also serves as a reminder to the user that an HPN service will be applied to forward calls and messages to the mobile station 120.

The mobile station 120 includes a transceiver 310 for receiving the aforementioned normal-strength page signals $P_1$, e.g., such as transmitted by the BSS 130. The transceiver 310 includes a receiver unit 311 and a transmitter unit 312 for responding to the aforedescribed page signals $P_1$ by transmission of a response signal $PR_1$, as shown in FIG. 3. The transmitter unit 312 modulates and amplifies the response signal $PR_1$. Both the receiver unit 311 and the transmitter unit 312 are connected to an antenna 320. The page signals PI are received by the receiver unit 311 through the antenna 320, which is preferably also used for transmitting the response signal $PR_1$ over the air interface. Also, the receiver and transmitter units 311 and 312, respectively, may be co-located into one single transceiver unit 310, as is understood in the art. The transceiver 310 in the mobile station 120 is furthermore adapted to receive the aforedescribed HPN page signals, the power levels for which are higher than the power levels of the normal-power page signals $P_1$. The HPN page signals $P_2$ may under certain circumstances, as described with reference to FIG. 1 above, also be terrestrial in origin, such as when the HPN page signal $P_2$ is sent out from the BSS 130 in the cellular part of the telecommunications system 90. If, nevertheless, the satellite-based HPN page signal $P_{2b}$ is forwarded to the mobile station 120 via the satellite 150, a satellite transceiver 330 is used to receive it. As with the aforementioned transceiver 310, the satellite transceiver 330 includes a satellite receiver 331, and a satellite transmitter 332 for receiving the satellite-based HPN page signal $P_{2b}$ and generating, modulating and amplifying the aforedescribed response signal $PR_{2b}$, respectively.

The satellite receiver 331 and a satellite transmitter 332 are both connected to a satellite antenna 340. The satellite receiver and transmitter 331 and 332 may also be co-located into one single satellite transceiver unit 330, as is understood in the art. The response signal $PR_{2b}$ preferably contains a predetermined symbol pattern (e.g., a sequence of binary 1's) which is sent on a communication resource especially dedicated for the purpose. A channel typically is chosen on a frequency having first-rate propagation properties under the prevailing topographical and atmospheric circumstances with the objective being to enhance the probability of the second response signal $PR_{2b}$ actually reaching the satellite 150.

A terrestrially-based broadcast signal $B_T$ from the BSS 130 and a satellite-based broadcast signal $B_S$ from the SBS 150 are sent out in the telecommunications system 90. The broadcast signals $B_T$ and $B_S$ provide all the mobile stations 120 roaming in the telecommunications system 90 with general information regarding the system parameters and data associated with the BSSs 130 and SBSs 150. In order to decipher the broadcast signals $B_T$ and $B_S$, the mobile station 120 also includes a central logic unit 350, which measures the power levels of the respective broadcast signals $B_T$ and $B_S$, and estimates therefrom a degree of communication coverage offered by the telecommunications system 90 at the mobile station's 120 current location. If the communication coverage is estimated as insufficiently low, control signals are passed on to an alerting apparatus for alerting the mobile station 120 user of this fact. Typically, an alert is initiated when no broadcast signals $B_T$ or $B_S$ at all can be distinguished by the mobile station 120.

For example, a light diode 360a may be set to generate a visual light signal, a speaker device 360b may be triggered to emit an acoustic signal (e.g., beep or play a sampled voice message), or a graphical display unit 360c may present text or symbols indicating that the mobile station 120 is located at a position where the telecommunications system 90 provides insufficient communication coverage for establishing a connection between the telecommunications system 90 and the mobile station 120 and/or to receive a text message via the telecommunications system 90.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a telecommunications system, a method for handling a mobile-terminated communication request from a requesting party, the method comprising the steps of:

receiving an incoming communication request from the requesting party, the incoming communication request being directed to a mobile station within the telecommunications system;

accessing a subscriber database for the telecommunications system to retrieve attachment information on whether the mobile station is attached to the telecommunications system;

if the mobile station is attached to the telecommunications system, sending, by the telecommunications system, a first page signal to the mobile station;

waiting, by the telecommunications system, a first predetermined time interval for the mobile station to respond to the first page signal;

if the first predetermined time interval elapses without the mobile station responding, determining if the mobile station has access to high power paging services;

if the mobile has access to high power paging services, accessing a high power screening list associated with the mobile station;

comparing an identifier associated with the requesting party to a plurality of identifiers within the high power screening list; and if said high power screening list permits said requesting party to make a second page signal to the mobile station, sending the second page signal to the mobile station, said second page signal having a higher power level than the first page signal.

2. The method according to claim 1, further comprising, after said step of sending the second page signal, the steps of:

waiting, by the telecommunications system, a second predetermined time interval for the mobile station to respond to the second page signal; and if the second predetermined time interval elapses without the mobile station responding, setting a detached status flag within the subscriber database corresponding to the mobile station.

3. The method according to claim 2, further comprising the step of:

if the detached status flag for the mobile station is set when the incoming communication request is received, forwarding the incoming communication request to a predetermined communication failure routine prior to accessing the subscriber database.

4. The method according to claim 3, further comprising the step of:

if the incoming communication request is a text message, storing the text message in a message store.

5. The method according to claim 4, wherein the step of forwarding the incoming text message to a predetermined communication failure routine comprises re-transmitting the text message when said subscriber database indicates that the mobile station is attached to the telecommunications system.

6. The method according to claim 4, wherein the step of forwarding the incoming text message to a predetermined communication failure routine comprises re-transmitting the text message after a third predetermined time interval has elapsed.

7. The method according to claim 4, further comprising the step of:

if the mobile station responds to the first page signal before the first predetermined time interval has elapsed, the incoming text message is delivered to the mobile station.

8. The method according to claim 4, further comprising the step of:

if the mobile station responds to the second page signal before the second predetermined time interval has elapsed, the incoming text message is delivered to the mobile station.

9. The method according to claim 1, further comprising, after said step of sending the second page signal, the steps of:

waiting, by the telecommunications system, a second predetermined time interval for the mobile station to respond to the second page signal; and if the second predetermined time interval elapses without the mobile station responding, repeating said step of sending the second page signal a plurality of times over a different time interval.

10. The method according to claim 1, further comprising the step of:

if the incoming communication request is a call, and if the mobile station responds to the first page signal before the first predetermined time interval has elapsed, establishing a connection between the requesting party and the mobile station.

11. The method according to claim 1, further comprising the step of:

if the incoming communication request is a call, and if the mobile station responds to the second page signal before the second predetermined time interval has elapsed, establishing a connection between the requesting party and the mobile station.

12. The method according to claim 1, further comprising the step of:

if the requesting party identifier is not included in the high power screening list, forwarding the incoming communication request to a predefined communication failure routine.

13. The method according to claim 12, wherein if the incoming communication request is a call, the step of forwarding the incoming communication request to the predefined communication failure routine comprises forwarding the incoming communication request to a voice mail service associated with the mobile station.

14. The method according to claim 12, wherein if the incoming communication request is a call, the step of forwarding the incoming communication request to the predefined communication failure routine comprises announcing to the requesting party that the mobile station is currently unreachable.

15. The method according to claim 1, further comprising the step of:

if the identifier of the requesting party is included in the high power screening list, forwarding the incoming communication request to a pre-defined communication failure routine.

16. The method according to claim 15, wherein if the incoming communication request is a call, the step of forwarding the incoming communication request to the pre-defined communication failure routine comprises forwarding the incoming communication request to a voice mail service associated with the mobile station.

17. The method according to claim 15, wherein if the incoming communication request is a call, the step of forwarding the incoming communication request to the pre-defined communication failure routine comprises announcing to the requesting party that the mobile station is currently unreachable.

18. The method according to claim 1, wherein the second page signal is a high-power notification message.

19. A telecommunications system for handling a mobile-terminated communication request from a requesting party to a mobile station, the telecommunications system, comprising:

a first mobile services switching center (MSC), the communication request from the requesting party being received by the first MSC, the first MSC routing an information request to a home location register (HLR) having a plurality of subscribers, one of the subscribers being associated with the mobile station, said HLR identifying a location within the telecommunications system for the mobile station;

a second MSC, said second MSC being identified by the HLR as the location of the mobile station within the telecommunications system;

a first paging means for paging the mobile station, the first paging means transmitting a first page signal to the mobile station;

a subscriber database, for exchanging information with the second MSC, the subscriber database comprising:

a connection status flag associated with the mobile station, said connection status flag indicating whether the mobile station is attached to the telecommunications system;

a high power screening list associated with the mobile station, an identifier associated with the requesting party being compared to each identifier within the high power screening list; and a second paging means for paging the mobile station, the second paging means transmitting a second page signal to the mobile station if the mobile station, pursuant to the value of the connection status flag, is attached to the telecommunications system, and if the requesting party identifier is permitted to reach the mobile station via the second page, pursuant to the high power screening list, said second page signal having a higher power level than the first page signal.

20. The system according to claim 19, wherein the first paging means comprises a base station subsystem (BSS) being associated with the second MSC.

21. The system according to claim 20, wherein the second paging means comprises a BSS, and wherein, if the mobile station fails to respond to the first page signal within a first predetermined time interval, if the connection status flag associated with the mobile station indicates that the mobile station is attached to the telecommunications system, and if the requesting party identifier is permitted to reach the mobile station via the second page signal, the BSS transmits the second page signal to the mobile station.

22. The system according to claim 19, wherein the second paging means comprises a satellite base station subsystem (SBS), and wherein, if the mobile station fails to respond to the first page signal within a first predetermined time interval, if the connection status flag associated with the mobile station indicates that the mobile station is attached to the telecommunications system, and if the requesting party identifier is permitted to reach the mobile station via the second page signal, the SBS transmits the second page signal to the mobile station.

23. The system according to claim 19, further comprising:
a High-Power Notification (HPN) node for controlling the second paging means, the HPN node being associated with the second MSC.

24. The system according to claim 21, further comprising:
an intelligent network (IN) services unit, with a Service Data Point (SDP), for carrying out IN services and holding the subscriber database.

25. A mobile station in a telecommunications system for receiving incoming communication requests, the mobile station comprising:

a first paging transceiver means for receiving a first page signal and responding thereto, the first page signal being sent to the mobile station if a connection status flag in a subscriber database within the telecommunications system indicates that the mobile station is attached to the telecommunications system; and a second paging transceiver means for receiving a second page signal and responding thereto, the second page signal having a higher power level than the first page signal, the second page signal being sent to the mobile station if the mobile station is attached to the telecommunications system and if an identifier associated with the requesting party is permitted to reach the mobile station via the second page signal, pursuant to a high power screening list, within the telecommunications system, the high power screening list being associated with the mobile station.

26. The mobile station according to claim 25, further comprising:

a measuring and control means for receiving broadcast signals transmitted from the telecommunications system, and for measuring and determining therefrom an estimate of a communication coverage at a current location of said mobile station; and an alerting means for alerting a user of the mobile station when said measuring and control means determines that the communication coverage is insufficient for establishing communication between the telecommunications system and the mobile station.

27. The mobile station according to claim 26, wherein said page signals are transmitted from a base station subsystem.

28. The mobile station according to claim 26, wherein said page signals are transmitted from a satellite base station subsystem.

* * * * *